(12) United States Patent
Noble et al.

(10) Patent No.: US 7,607,898 B2
(45) Date of Patent: Oct. 27, 2009

(54) METHOD AND APPARATUS FOR DELIVERING PRESSURIZED GAS

(75) Inventors: Stephen D. Noble, West Vancouver (CA); Thomas C. Brook, Shawnigan Lake (CA); Daniel J. H. Brennan, Vancouver (CA); Valerie Nadia LeBlanc, Vancouver (CA)

(73) Assignee: Westport Power Inc., Vancouver (CA)

( * ) Notice: Subject to any disclaimer, the term of this patent is extended or adjusted under 35 U.S.C. 154(b) by 633 days.

(21) Appl. No.: 10/497,429

(22) PCT Filed: Nov. 27, 2002

(86) PCT No.: PCT/CA02/01827

§ 371 (c)(1),
(2), (4) Date: Feb. 7, 2005

(87) PCT Pub. No.: WO03/046360

PCT Pub. Date: Jun. 5, 2003

(65) Prior Publication Data

US 2005/0147513 A1    Jul. 7, 2005

(30) Foreign Application Priority Data

Nov. 30, 2001   (CA) .................................. 2362881

(51) Int. Cl.
*A61M 1/00* (2006.01)
*F04B 19/24* (2006.01)
*F04F 1/18* (2006.01)

(52) U.S. Cl. ........................ 417/437; 417/207
(58) Field of Classification Search ................ 62/50.2, 62/50.6, 45.1; 417/207, 437, 313, 901, 545, 417/555.1, 373, 399, 401
See application file for complete search history.

(56) References Cited

U.S. PATENT DOCUMENTS

| | | | | |
|---|---|---|---|---|
| 2,973,629 A | * | 3/1961 | Lady | 62/654 |
| 3,067,590 A | * | 12/1962 | Wood, Jr. | 62/335 |
| 3,720,057 A | * | 3/1973 | Arenson | 60/772 |
| 3,898,853 A | * | 8/1975 | Iung | 62/50.1 |
| 4,170,115 A | * | 10/1979 | Ooka et al. | 62/50.2 |
| 4,220,183 A | | 9/1980 | Gokcek | |
| 4,494,415 A | | 1/1985 | Elliston | |
| 4,559,786 A | * | 12/1985 | Schuck | 62/50.6 |
| 4,705,189 A | | 11/1987 | Theissen et al. | |
| 4,738,115 A | | 4/1988 | Goode | |
| 4,915,602 A | * | 4/1990 | Tschopp | 417/503 |

(Continued)

*Primary Examiner*—Charles G Freay
*Assistant Examiner*—Alexander B Comley
(74) *Attorney, Agent, or Firm*—McAndrews, Held & Malloy, Ltd.

(57) ABSTRACT

This invention relates to an apparatus for pressurizing a fluid and delivering a gas comprising a pump, an accumulator and a heater such that the pump pressurizes a quantity fluid received from a fluid store and delivers that pressurized fluid to an accumulator. The accumulator then delivers a quantity of the pressurized fluid to a heater that, in turn, warms the fluid to a gas within a specified temperature and pressure range to be delivered to the end user as required. The invention further relates to a method of delivering a gas at a desired pressure and temperature wherein a quantity of fluid is received, pressurized and stored as a fluid in an accumulator storage vessel at a desired pressure. The fluid is then delivered from the accumulator to a heater where it is warmed and delivered to the end user as a gas at specified temperature and pressure.

48 Claims, 7 Drawing Sheets

U.S. PATENT DOCUMENTS

| | | | |
|---|---|---|---|
| 4,938,376 A | | 7/1990 | Fieseler et al. |
| 5,107,906 A | * | 4/1992 | Swenson et al. ............... 141/11 |
| 5,127,230 A | * | 7/1992 | Neeser et al. .................... 62/7 |
| 5,301,723 A | | 4/1994 | Goode |
| 5,315,831 A | | 5/1994 | Goode et al. |
| 5,325,894 A | * | 7/1994 | Kooy et al. ..................... 141/4 |
| 5,327,730 A | | 7/1994 | Myers et al. |
| 5,353,849 A | * | 10/1994 | Sutton et al. .................. 141/44 |
| 5,360,139 A | | 11/1994 | Goode |
| 5,373,700 A | | 12/1994 | McIntosh |
| 5,386,699 A | | 2/1995 | Myers et al. |
| 5,411,374 A | * | 5/1995 | Gram .......................... 417/53 |
| 5,415,001 A | * | 5/1995 | Powars ....................... 62/50.2 |
| 5,421,162 A | * | 6/1995 | Gustafson et al. ................ 62/7 |
| 5,430,927 A | | 7/1995 | Rogers |
| 5,465,583 A | | 11/1995 | Goode |
| 5,477,690 A | * | 12/1995 | Gram ......................... 62/45.1 |
| 5,490,603 A | | 2/1996 | Davis |
| 5,505,232 A | * | 4/1996 | Barclay ....................... 141/11 |
| 5,518,140 A | | 5/1996 | Lenz et al. |
| 5,545,015 A | | 8/1996 | Scherrer ..................... 417/360 |
| 5,575,626 A | * | 11/1996 | Brown et al. ................. 417/251 |
| 5,682,750 A | | 11/1997 | Preston et al. |
| 5,765,602 A | | 6/1998 | Sutton et al. |
| 5,771,946 A | * | 6/1998 | Kooy et al. ..................... 141/82 |
| 5,787,940 A | * | 8/1998 | Bonn et al. ..................... 141/18 |
| 5,832,906 A | * | 11/1998 | Douville et al. ............. 123/527 |
| 5,842,500 A | | 12/1998 | Rockwood et al. |
| 5,884,488 A | * | 3/1999 | Gram et al. .................. 62/50.6 |
| 5,896,881 A | | 4/1999 | Herzog et al. |
| 5,913,344 A | | 6/1999 | Wronski et al. |
| 5,937,655 A | * | 8/1999 | Weiler et al. ................. 62/50.1 |
| 5,996,649 A | | 12/1999 | Sutton et al. |
| 6,000,226 A | * | 12/1999 | Lee et al. ..................... 62/48.1 |
| 6,073,081 A | | 6/2000 | Hettinger et al. |
| 6,142,191 A | | 11/2000 | Sutton et al. |
| 6,176,046 B1 | | 1/2001 | Quine et al. |
| 6,192,280 B1 | * | 2/2001 | Sommer et al. ............. 607/122 |
| 6,196,280 B1 | | 3/2001 | Tate, Jr. et al. |
| 6,220,037 B1 | * | 4/2001 | Heilman ..................... 62/50.6 |
| 6,247,594 B1 | | 6/2001 | Garton |
| 6,354,088 B1 | * | 3/2002 | Emmer et al. ................ 62/50.1 |
| 6,530,761 B1 | * | 3/2003 | Chalk et al. ................. 417/552 |
| 6,640,556 B2 | * | 11/2003 | Ursan et al. .................. 62/50.6 |
| 6,663,350 B2 | * | 12/2003 | Tyree, Jr. ..................... 417/53 |
| 6,698,211 B2 | * | 3/2004 | Gustafson ................... 62/50.2 |
| 6,722,866 B1 | * | 4/2004 | Dresler ....................... 417/534 |
| 2002/0085921 A1 | * | 7/2002 | Gram et al. ................... 417/53 |

\* cited by examiner

METHOD AND APPARATUS FOR DELIVERING PRESSURIZED GAS

FIELD OF THE INVENTION

This invention relates to an apparatus for delivering high pressure gas.

BACKGROUND OF THE INVENTION

Delivering pressurized gas can be facilitated by first pumping or pressurizing it in a fluid phase when the substance is denser than it is in the gaseous phase. Of course, when an end user requires a gas, such a method requires an additional processing step to convert the pressurized fluid to a gas. For example, after a liquefied gas is pressurized, a heater may be employed to warm or boil the pressurized fluid to convert it into a gas. However, many applications, including lower pressure systems, do not warrant the additional equipment and processing steps required to utilize the above process, rendering this method impractical in these situations.

Frequently, where gas delivery systems experience sudden demands that cannot be met by the pump alone, an accumulator is included in the delivery system. Generally, conventional delivery systems include an accumulator preceding and often adjacent to the point of delivery allowing for an immediate supply of pressurized gas. A significant restraint on accumulators, however, is the fact that they, as storage vessels, require space. In many applications sufficient space for a conventional accumulator is not available or is impractical near the delivery point. By way of example, end users of high pressure gaseous fuels or combustion catalysts such as stand alone generators or natural gas powered vehicles typically use a plurality of fuel injection valves and thus have a plurality of delivery points for injecting fuel into an engine. Space for a conventional accumulator is typically not available next to each injection valve. In any event, space is limited in and around these engines in many cases especially where such space must be, in effect, transported along with a vehicle reducing room for storage or other uses. Examples of such fuels or combustions catalyst include methane, propane, ethane and derivatives of these hydrocarbons, as well as hydrogen and oxygen For the purposes of this application it will be understood that any references to fluids include liquids as well as liquids pressurized above the supercritical point of the gas of interest. Similarly, any references to gases include gases pressurized above the supercritical point of those gases. More generally, if the desired substance to be delivered is to be delivered at a pressure placing it above the supercritical point of the substance, then that substance generally will also be included in any reference to a gas where corresponding fluid is, at some point in the gas delivery system, at a lower temperature and pressure prior to being delivered.

SUMMARY OF THE INVENTION

The present invention is an apparatus that includes a pump that has an intake opening so that it can receive a quantity of the cryogenic fluid, pressurize it to a pressure above its storage pressure and deliver it to an accumulator within the cryogen space. The accumulator includes a storage volume to hold the pressurized fluid so that it is available depending on the demands of the end user. Beyond the accumulator the invention includes a heater that accepts the pressurized fluid from the accumulator and delivers a pressurized gas at a temperature greater than the initial temperature at which the fluid is stored.

The heater included in the invention may in, in a further embodiment, include a heating substance and at least one channel for housing that heating substance. The heating substance should be capable of warming the cryogenic fluid to convert it from a fluid to a gas as desired. The included heating substance may be a heating fluid capable of being circulated through one or more channels found in the heater. One embodiment of the invention contemplates delivering a fuel from the delivery outlet of the heater for use in an engine as well as utilizing the engine coolant as a heating fluid.

A further embodiment of apparatus includes a heater with a fluid passageway for directing the fluid from through the channel noted above to a delivery outlet. The fluid passageway may be defined by a pipe.

A further embodiment of the invention includes one or more reciprocating pumps for delivering the pressurized fluid.

A further embodiment of the invention includes one or more drive units capable of driving the pump. The drive unit may be in communication with the pump via a piston rod running between the drive unit and the pump.

A further embodiment of the invention includes an accumulator that includes a sleeve which defines an accumulator space as well as a storage vessel that defines the storage volume. The storage vessel may be a coil tube. Further, the sleeve may also be a thermal insulator inhibiting thermal conduction into the cryogen space. The accumulator space may also include insulators including thermal convection inhibitors as well as thermal conduction inhibitor and/or an evacuated space within this accumulator space.

Any material in the accumulator space or between the accumulator and heater designed to reduce heat transfer may be chosen such that it falls below 15 W/m×K.

In a further embodiment of the invention the apparatus may integrate the pump, accumulator and heater together wherein the accumulator would be integrated between the pump and heater, by way of example, in a single encasing or casing assembly. Integrated connections between each component within a single casing assembly help to eliminate potential failure point in the apparatus as a whole.

The present invention also contemplates a method of receiving a quantity of a fluid at an initial pressure, pressurizing that fluid and storing the fluid within an accumulator readily available for delivery within a pre-determined pressure range, and heating and delivering the fluid as a pressurized gas from the accumulator storage.

The fluid in question in the invention may be at a pressure above or below the supercritical point of that fluid and the gas may too be above or below the supercritical point of the delivered gas. The gas delivered, however, must be at a higher pressure than its pressure in storage prior to pumping and being delivered to the accumulator. Also, the temperature of the delivered gas must at a temperature above that of the fluid found in storage prior to being pumped and delivered to the accumulator and onwards to the heater.

The present invention includes embodiments that draw from a stored fluid prior to pumping that includes fluids that comprise at least one of methane, methanol, ethane, propane, hydrogen, oxygen, butane, methane, ethane or other hydrocarbon derivatives that are gases at room temperature and atmospheric pressure, as well as, generally, a fluid that comprises an element that is combustible as a gas.

DETAILED DESCRIPTION OF PREFERRED EMBODIMENT(S)

Throughout the following description specific details are set forth in order to provide a more thorough understanding of the invention. However, the invention may be practiced without these particulars. In other instances, well known elements have not been shown or described in detail to avoid unnecessarily obscuring the present invention. Accordingly, the specification and drawings are to be regarded in an illustrative, rather than a restrictive, sense.

Generally, the subject invention relates to an integrated apparatus that incorporates a pump, an accumulator and a heater for pressurizing and delivering a gas. A fluid is pressurized in the apparatus and delivered from the apparatus as a gas.

Figure 1:
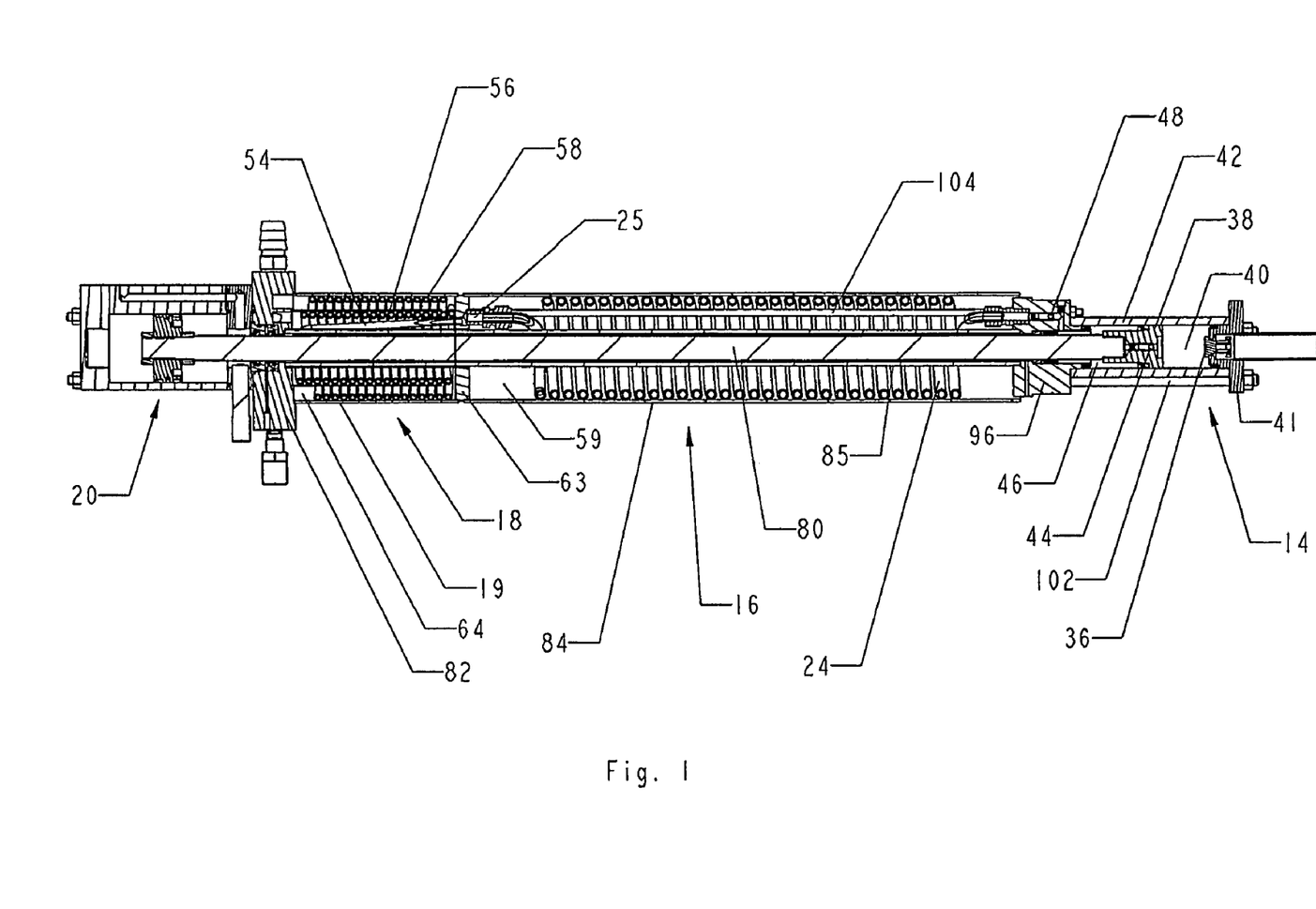
FIG. 1 is a cross sectional side view of an embodiment of the subject apparatus.
Figure 2:
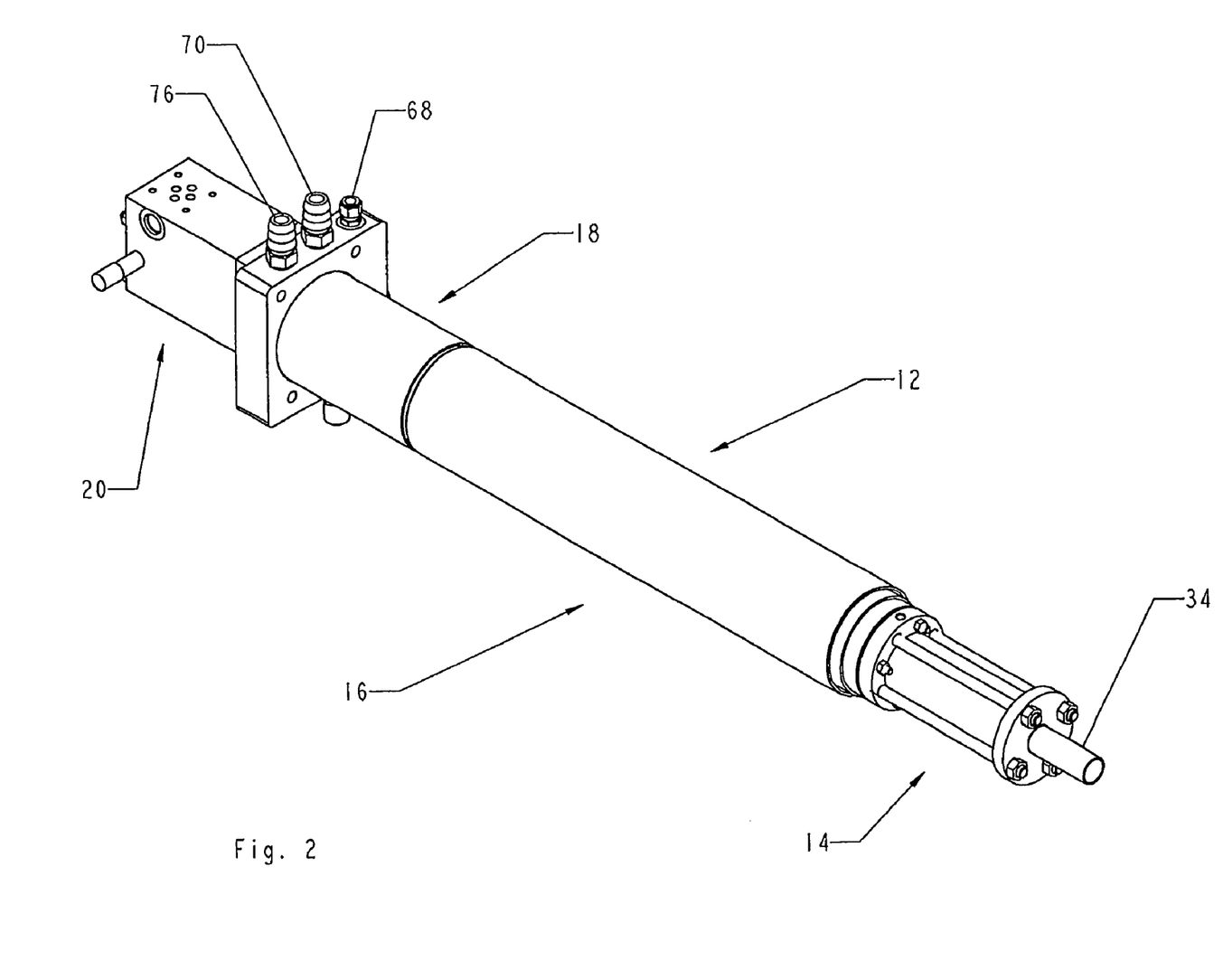
FIG. 2 is a perspective view of an embodiment of the subject apparatus.
Figure 3:
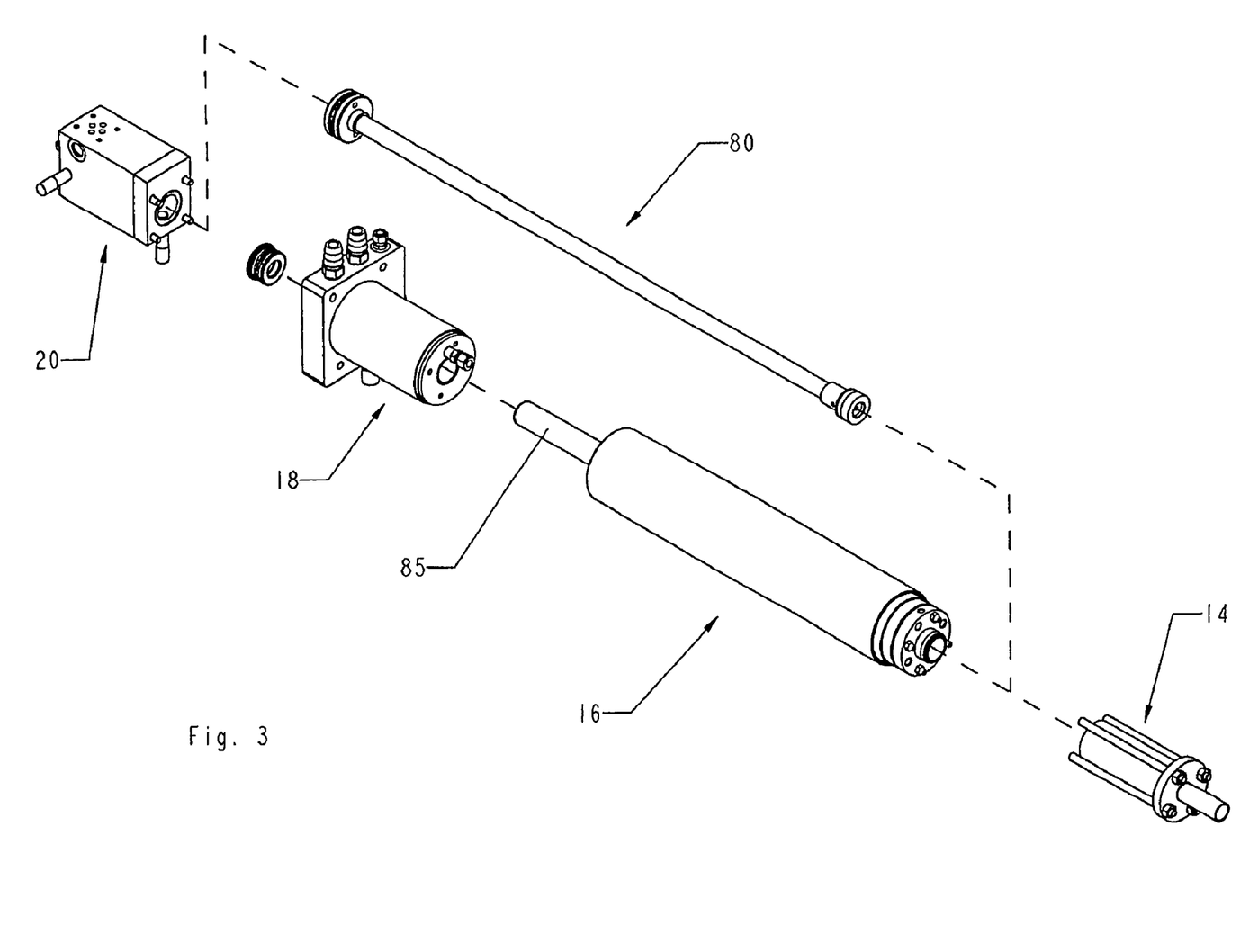
FIG. 3 is an exploded view of the four sections of the subject apparatus.
Figure 4:
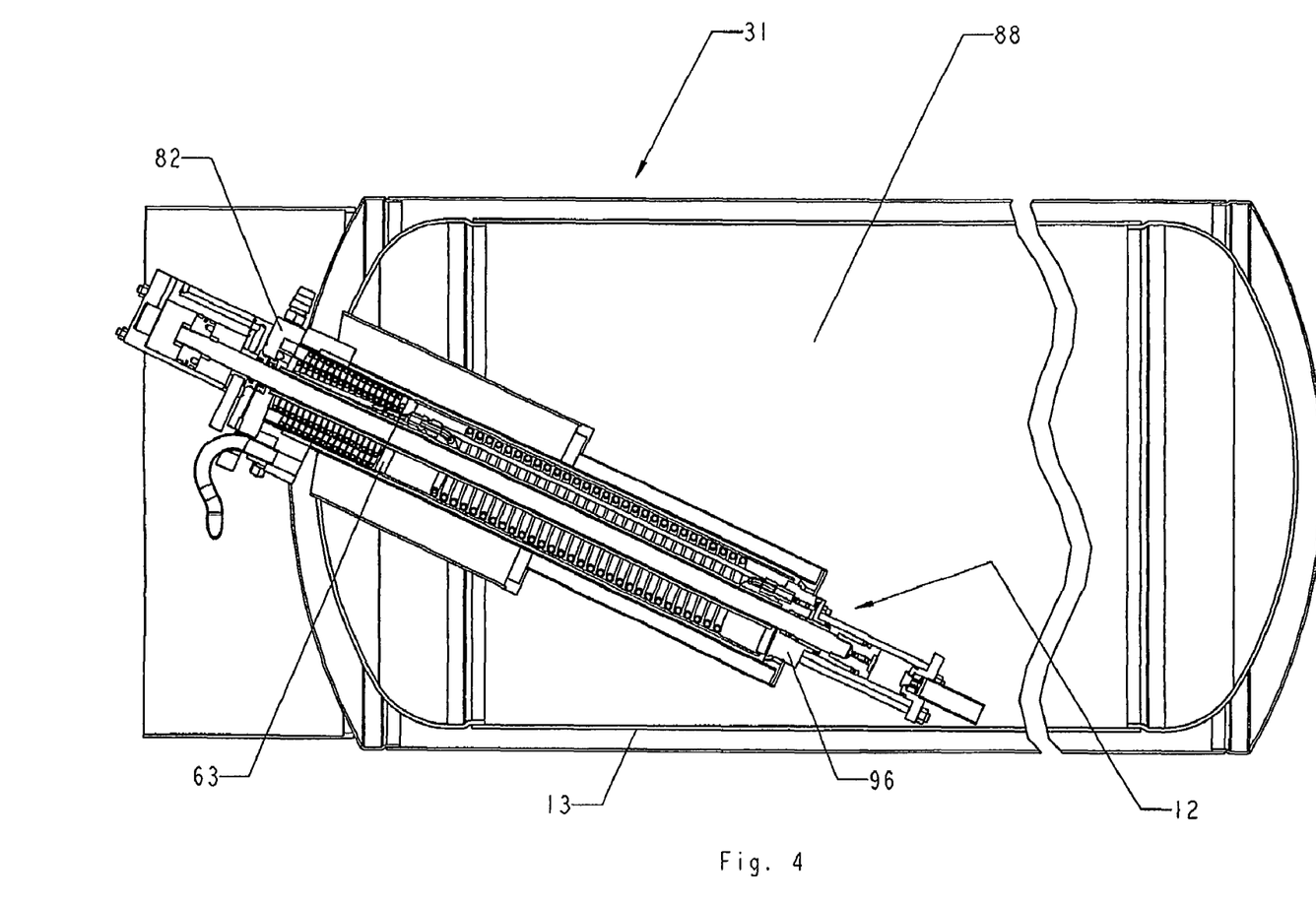
FIG. 4 is a cross sectional side view of an example operational environment within which the subject apparatus would operate.

With reference to FIGS. 2 and 3, apparatus 12 incorporates four distinct sections: cold end 14, accumulator 16, heater section 18 and drive section 20. With reference to the cross sectional side view found in FIG. 1, generally, a fluid pressurizing means such as a pump is housed in or embodied by cold end 14. Accumulator 16 is defined herein as comprising accumulator coil 24 and also the components that enable accumulator coil 24 to function as an accumulator as shown in the section generally identified as accumulator 16 A heater is housed in or embodied by heater section 18, and a pump driver is housed in or embodied by drive section 20. Referring to FIG. 4, in use apparatus 12 may extend into, by way of example, fluid holding tank assembly 31, which is capable of storing a fluid within vessel 13.

By way of example, a preferred style of pump is a reciprocating piston pump as shown in the figures. The pump comprises compression cylinder 42 within which piston 38 is disposed, dividing compression cylinder 42 into intake chamber 40 and pressure chamber 46. Intake chamber 40 is further defined by end plate 41, which seals one end of compression cylinder 42. The opposite end of compression cylinder 42 is sealed by intermediate plate 96, which further defines pressure chamber 46. In a preferred arrangement, tie rods 102 are employed to hold compression cylinder 42 between end plate 41 and intermediate plate 96.

Fluid may flow into intake chamber 40 through intake tube 34 and then through inlet check valve 36, which are both preferably associated with end plate 41. Piston 38 is dynamically sealed against the interior walls of compression cylinder 42 is known to those skilled in the art. Piston 38 is movable within compression cylinder 42 under the influence of a pump driver housed in driver section 20, which is linked to piston 38 by piston shaft 80. Seals between piston shaft 80 and intermediate plate 96 prevent fluid from escaping therebetween.

Piston check valve 44 allows the one-way flow of fluid from intake chamber 40 to pressure chamber 46. Pump discharge check valve 48 is disposed within a discharge passage leading from pressure chamber 46. Pump discharge check valve 48 allows the one-way flow of fluid from pressure chamber 46 to accumulator coil 24.

In a preferred embodiment, at least a portion of the accumulator storage volume is defined by accumulator coil 24 which is a tube in the shape of a coil. Pressurized fluid received from the pump may be stored within the accumulator storage volume. As shown in the illustrated embodiments, accumulator coil 24 may be conveniently disposed around piston shaft 80. Accumulator 16 encloses accumulator coil 24 between intermediate plate 96 and boundary flange 63. At least one tie rod 104 parallel to piston shaft 80 may be employed to hold accumulator 16 between intermediate plate 96 and boundary flange 63. An accumulator with a coiled storage volume, while only one possible embodiment, is advantageous as it adapts well to temperature and pressure changes within the system. However, any one of many alternate accumulator designs may be used. These include accumulator cylinders or other storage vessels.

In the illustrated embodiment, the fluid flows from accumulator coil 24 to heater section 18 through fluid outlet 25. The accumulator is separated from heater section 18 by boundary flange 63 which is preferably made from a material selected to reduce heat transfer from heater section 18 to the accumulator. For example, boundary flange 63 may be made from G10 glass fibre composite, which has a thermal conductivity of about 2.1 W/m×K.

Similarly, accumulator sleeve 84 extends from intermediate plate 96 through to boundary flange 63, housing the accumulator coil 24 and defining accumulator space 59 within the accumulator helping to prevent heat transfer from the heater section into the accumulator and the pump. Insulating material may be included in the accumulator space such as convection barriers for preventing convective heat flow through the accumulator, conductive thermal insulators, an evacuated space, or a combination of such thermal insulation measures.

It is preferable for the fluid within the accumulator to be maintained at colder temperatures since warming the pressurized fluid will decrease its density and may even cause it to be converted to a gas negating the benefits of storing the fluid where a fluid can be stored in a denser state compared to the same fluid stored in a gaseous phase. Accordingly, it is desirable to prevent heat from being transferred from heater section 18 to the accumulator to maximize the amount of fluid that can be stored in the accumulator.

By way of example, in the case of natural gas, pressurized liquefied natural gas, depending upon the operational conditions, may be about three times denser than the same quantity of pressurized natural gas in a gaseous form. By maintaining a fluid within accumulator coil 24, each incremental increase in the accumulator coil volume in the accumulator corresponds to, utilizing the example above, an equivalent three fold increase in a corresponding volume of the same fluid in gaseous form. In other words, by placing the accumulator upstream of the heater and thermally isolated therefrom, a greater density can be stored per unit of accumulator volume. Utilizing the same example, an accumulator coil volume of approximately 0.3 litres of natural gas equals approximately 0.90 litres of natural gas found in prior art accumulators designed to store fuel at pressures similar to the gas exiting apparatus 12 found in the described embodiment.

Heater section 18 is described with reference to FIGS. 2 and 7. In a preferred arrangement, a heat exchanger is employed to transfer heat to the pressurized fluid from a heat exchange fluid housed in the heat exchanger that is capable of warming the pressurized fluid. The pressurized fluid flows sequentially from fluid outlet 25 through heater introduction tube 54, inner tubular coil 56, outer tubular coil 58, and then finally through delivery nozzle 68. The amount of heat transferred to the pressurized fluid is sufficient to convert the pressurized fluid to a gas.

Introduction tube 54 and inner tubular coil 56 are disposed within inner heat bath channel 60 and outer tubular coil 58 is disposed within outer heat bath channel 64. Inner channel 60 communicates with heat exchange fluid inlet 70 (shown in FIG. 2). Channel passageway 72 allows a heat exchange fluid to flow from inner channel 60 to outer channel 64. Outer channel 64 communicates with heat exchange fluid outlet 76 (shown in FIG. 2).

Rod sleeve 85 extends from intermediate plate 96 through to drive head flange 82, preventing heat exchange fluid from leaking past the seals and bearings associated with piston shaft 80. Heater sleeve 19 extends between drive head flange 82 and boundary flange 63, further defining outer channel 64.

A feature of the illustrated preferred apparatus is that the pump, accumulator coil 24 and the heater are integrated in series. This is contrary to conventional systems which located an accumulator proximate to the end user and downstream from the heater. Another advantage is that the pump may be coupled directly to accumulator coil 24 which, in turn, may be directly coupled to the heater without the necessity of interconnecting piping and the additional joints associated therewith.

The method of operating the apparatus is described below. In operation, piston 38 is at rest or being actuated in a retraction stroke or an extension stroke. The events occurring during a retraction stroke are described first.

Figure 5:
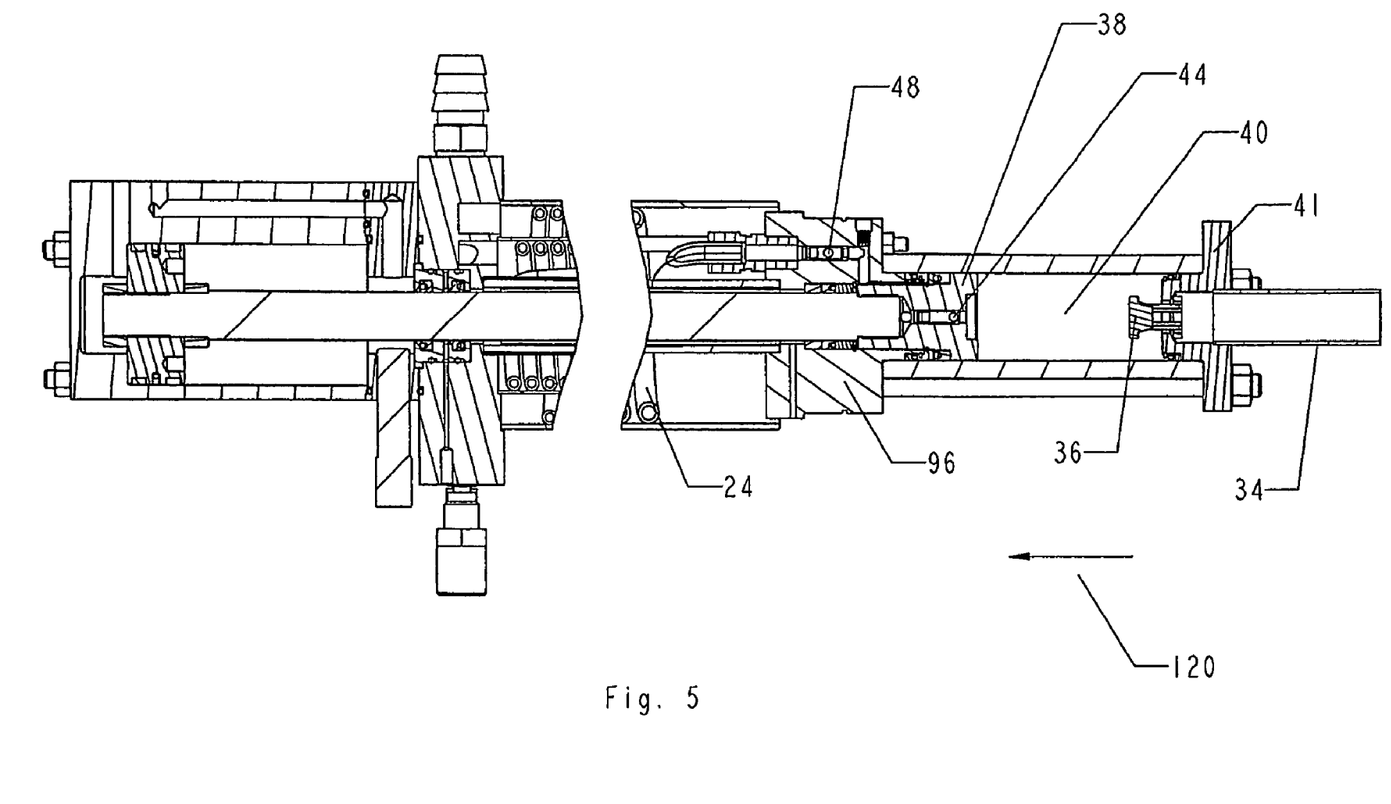
FIG. 5 is a cross sectional side view of a preferred embodiment of the subject apparatus with the piston completing a retraction stroke.
Figure 6:
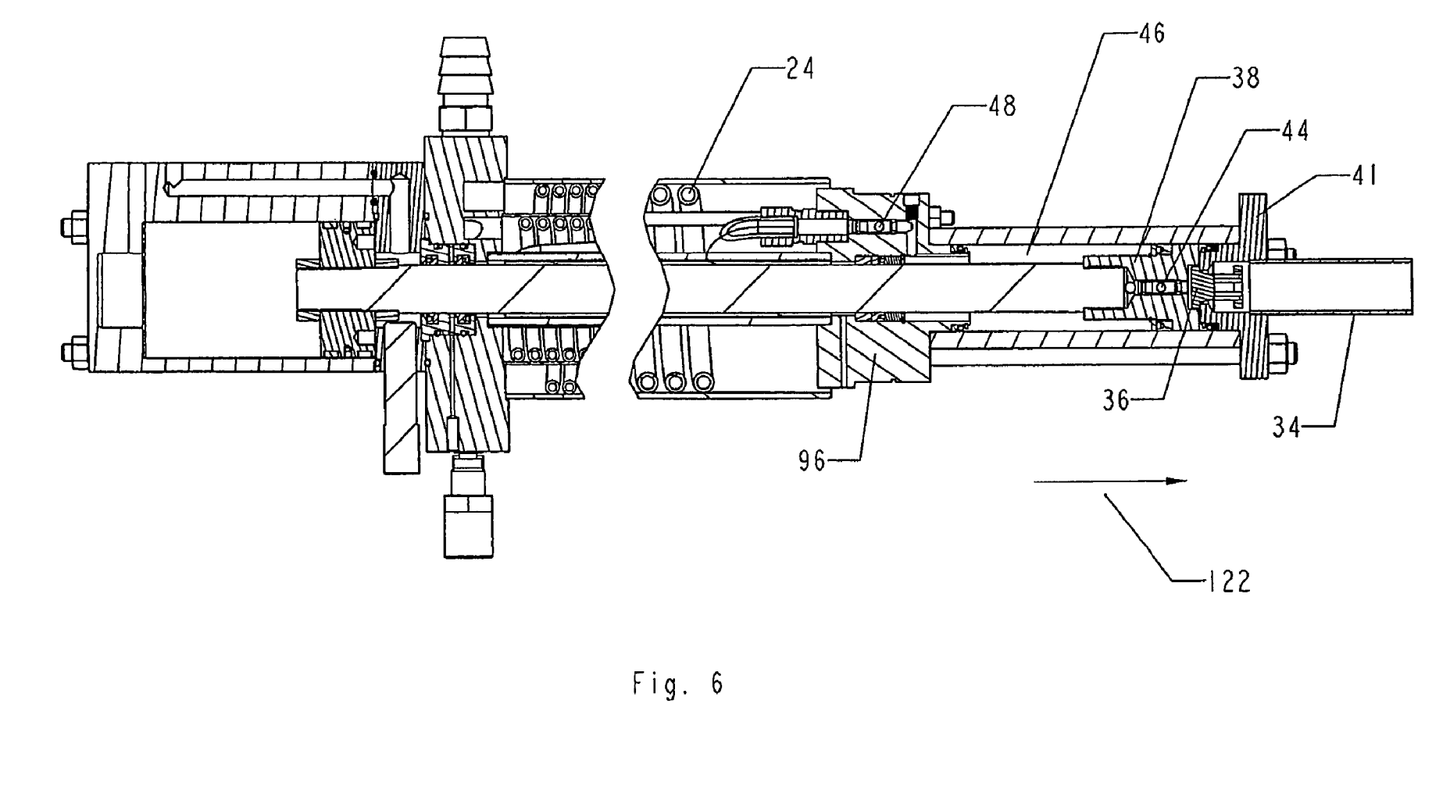
FIG. 6 is a cross sectional side view of a preferred embodiment of the subject apparatus with the piston completing an extension stroke.

With reference to FIG. 5, piston 38 has just completed a retraction stroke by moving in the direction of arrow 120 from a position proximate to end plate 41 to a position proximate to intermediate plate 96. Inlet check valve 36 is opened and fluid has flowed into intake chamber 40 through intake tube 34. At the same time, fluid that was in pressure chamber 46 (shown in FIG. 6), has been pressurized to a pressure that holds piston check valve 44 closed. The retraction of piston 38 has also caused the volume of pressure chamber 46 to be reduced whereby earlier in the retraction stroke, the fluid pressure within pressure chamber 46 was elevated to a pressure higher than the pressure of the pressurized fluid within accumulator coil 24, causing pump discharge valve 48 to open, resulting in some of the pressurized fluid flowing from pressure chamber 46 to accumulator coil 24.

Of course, as would be apparent to a person skilled in the art, it would be possible to feed fluid from pressure chamber 46 directly into accumulator coil 24 without passing it first through a check valve, however, operation of the apparatus and gas delivery system as a whole is enhanced by including pump discharge check valve 48. Amongst other things, the inclusion of pump discharge check valve 48 helps to reduce pressure variations downstream of the pump.

Figure 7:
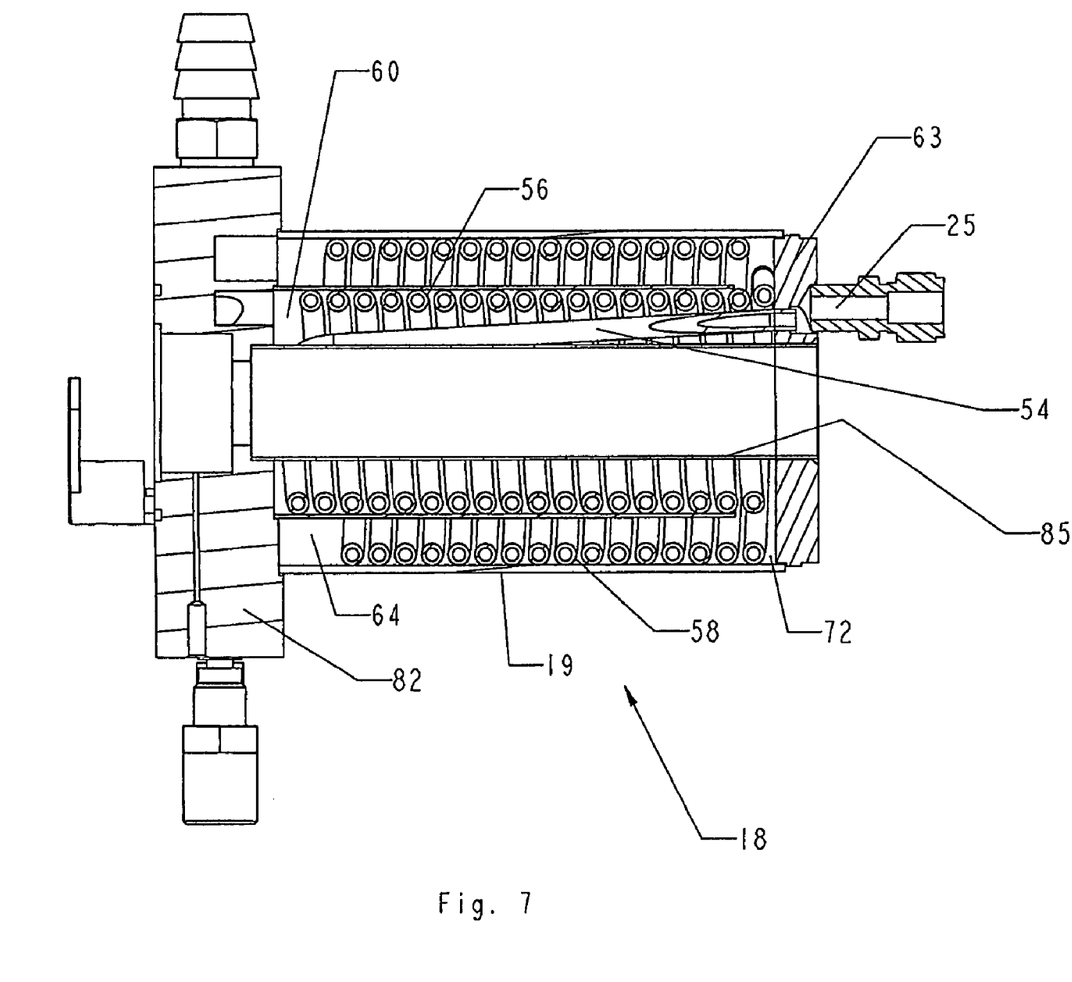
FIG. 7 is a cross sectional side view of the heater section of the subject apparatus.

The introduction of pressurized fluid into accumulator coil 24 from pressure chamber 46 displaces pressurized fluid already within accumulator coil 24 such that pressurized fluid flows through accumulator fluid outlet 25 and into heater section 18 (see FIG. 7).

The operation of heater section 18 will be described with reference to FIG. 7. Pressurized fluid enters heater section 18 from accumulator fluid outlet 25 through heater introduction tube 54. The pressurized fluid entering heater section 18 may still be at a cryogenic temperature that may be lower than the freezing temperature of the heat exchange fluid. To reduce the likelihood of freezing the heat exchange fluid, heater introduction tube 54 directs the pressurized fluid to a location proximate to where the heat exchange fluid is first introduced into the heater. In the illustrated embodiment, heat exchange fluid is first introduced into inner heat bath channel 60 near drive head flange 82. Accordingly, the coldest part of inner coil 56 is exposed to the warmest part of the heat bath.

The heat exchange fluid flows through inner channel 60 and outer channel 64 in the same general direction as the pressurized fluid flowing through inner tubular coil 56 and then outer tubular coil 58. Depending on the operating conditions for the particular application for which the apparatus is employed, and, in particular, the temperature of the pressurized fluid and the temperature of the heat exchange fluid, the length of the pressurized fluid coil within the heat bath is determined so that the pressurized fluid exits heater section 18 as a gas that has been heated to a temperature within a predetermined temperature range. The gas will of course also be delivered from the apparatus at a temperature within a desired predetermined pressure range.

When the apparatus is employed to deliver a gaseous fuel to an engine, the engine coolant is an example of a suitable and convenient heat exchange fluid that may be delivered to the apparatus. In such an apparatus, engine coolant that has been heated after passing through the cooling jacket of the engine may be delivered to the heat bath in heater section 18 where it is cooled prior to being returned to the engine cooling system.

A complete pump cycle includes a retraction stroke and an extension stroke. The extension stroke is described with reference to FIG. 6, which depicts piston 38 having just completed an extension stroke by moving in the direction of arrow 122 from a position proximate to intermediate plate 96 to a position proximate to end plate 41.

During the extension stroke, the movement of piston 38 in the direction of arrow 122 pressurizes the fluid within intake chamber 40 (shown in FIG. 5) causing inlet check valve 36 to close and piston check valve 44 to open. The fluid pressurized within intake chamber 40 flows through open piston check valve 44 into pressure chamber 46. At the beginning of the extension stroke, the pressure within pressure chamber 46 is lower than the pressure of the fluid within accumulator coil 24. Accordingly, pump discharge check valve 48 is held closed by the pressure differential. Later in the extension stroke, because the volume of intake chamber 40 is much larger than the volume of pressure chamber 46, the transfer of the fluid into pressure chamber 46 causes the pressure therein to rise. Eventually, the pressure within pressure chamber 46 exceeds the pressure of the fluid within accumulator coil 24 and pump discharge check valve 48 opens to allow some of the fluid within pressure chamber 46 to flow into accumulator coil 24.

In this manner, the pump operates as a double acting pump. In preferred arrangements, the displaceable volume of intake chamber 40 is sized at about two times larger than the displaceable volume of pressure chamber 46. Preferably, the quantity of fluid discharged from the pump is about equal for each extension and retraction stroke.

The flow of the pressurized fluid through accumulator coil 24 and the operation of heater section 18 is essentially the same as described with respect to the retraction stroke and, as such, will not be repeated with respect to the extension stroke.

As is well known in the art, the apparatus may be operated to maintain certain parameters such as, for example, the pressure within the accumulator, or the pressure and temperature of the fluid delivered from the apparatus. One or more sensors within the delivery system or apparatus 12, may be employed to cause a controller to activate the pump driver housed in the drive section. The pump driver, in turn, actuates piston shaft 80 to drive piston 38 according to the pump cycle described above. At times when demand is low, the controller may also cause pump piston 38 to remain at rest.

In the preferred arrangement described above, the heater section employs a particular embodiment of a heat exchanger to transfer heat from a heat exchange fluid to the pressurized fluid. Of course, as would be apparent to a person skilled in the art, alternate variations of the heater found in the embodiment discussed above may be utilized. For example, instead of an inner and outer coil for conveying the pressurized fluid, a single coil may be employed. Other variations on the embodiment discussed include but are not limited to alternate configurations that utilize a warmed channel or set of channels through which the pressurized fluid is circulated, heated, and converted to a gas.

More generally, however, conventional heaters may be housed in the heater section without affecting the spirit of the invention. As noted above, the benefits of the invention are realized where a heater functions within the apparatus in a space that allow for a maximization of the volume in the accumulator. Such heaters include elements for transferring heat to a fluid thus raising the temperature of the fluid to operational temperatures within a time frame to meet the operational parameters of the subject system. These conventional heaters may include electric heaters such as heaters employing a hot wire element, fins, plates and frames, and other devices well known to those skilled in the art.

Referring to the embodiment of the apparatus shown in FIG. 4, the apparatus in this operating environment draws in a low pressure fluid from tank assembly 31 and delivers the fluid in as a pressurized gas. Generally, a temperature gradient is introduced in such a system:

along an axis running parallel to piston shaft 80; and, at right angles to piston shaft 80 varying along the length of the shaft from a maximum in parts of heater section 18 to a nominal gradient within the cold section and other upstream parts of accumulator 16.

Maintaining the axial temperature gradient, that is, the temperature gradient parallel to the axis of piston shaft 80, is important because any heat leak into the accumulator coil from the heater decreases the density of this fluid and negates the advantages realized by providing the accumulator upstream of the heater where a cooler fluid environment exists. The axial temperature gradient may be maintained by providing barriers to thermal conductivity between the four sections of apparatus 12. The embodiment shown provides boundary flange 63 and drive head flange 82. These flanges separate the accumulator shown as accumulator 16 and heater section 18 and heater section 18 and drive section 20, respectively. As mentioned above, thermal separation between heater section 18 and accumulator coil 24 is particularly important.

While these flanges help to thermally isolate these sections of the apparatus, the fluid flow through apparatus 12 also helps to transport heat away from cold end 14 and in the direction of warmer heater section 18 and out of the system. Also, the use of accumulator coil 24 as opposed to another type of accumulator storage vessel, lengthens the conductive heat path from heater section 18 to cold end 14.

Other heat paths through the accumulator include a convective heat path through the space surrounding accumulator coil 24. As mentioned above, insulating materials can be included within this accumulator space to help thermally isolate heater section 18 and the accumulator and cold end 14. Again barrier materials may also be used to reduce thermal convection resulting from circulating gases within this accumulator space. Alternatively, the accumulator space surrounding accumulator coil 24 may be evacuated.

A further heat path from heater section 18 into the accumulator runs along accumulator sleeve 84. Suitable insulating materials known to persons skilled in the art may be employed to help with thermally isolating heater section 18 from accumulator 16 and cold end 14. In the illustrated embodiment, accumulator coil 24 contains the pressurized fluid so accumulator sleeve 84 need not be designed to contain pressurized cryogenic fluids. Therefore, the selected material for sleeve 84 may be chosen with priority to thermal conductivity properties rather than for structural characteristics.

The transverse temperature gradient, that is, the temperature gradient generally perpendicular to piston shaft 80, is also a potential problem when positioning apparatus 12, for example, within tank assembly 31. Tank interior space 88 is held at a much cooler temperature than that found within heater section 18. As the fluid is heated along its path through accumulator coil 24 and into inner and outer tubular coils (56, 58) in heater section 18, a transverse temperature gradient is established between the pressurized fluid and tank interior space 88. The transverse temperature gradient increases as the fluid flows into and through heater section 18 where the fluid is eventually converted into a gas. Accumulator sleeve 84 and heater sleeve 19 are constructed of materials suitable to help insulate the apparatus from a tank interior. In this case, the sleeves acts to inhibit transverse heat flow from apparatus 12 through to any exterior environment.

Referring to FIGS. 1 and 2, in the illustrated embodiment, apparatus 12 is bound together by tie rods. As described above, cold end 14 and accumulator 16 are joined together by compression cylinder tie rods 102, and accumulator tie rods 104 run the length of accumulator 16 holding the accumulator between heater section 18 and cold end 14. While tie rods have been found to provide a cost and maintenance advantage, those skilled in the art will understand that the apparatus may also be bound by numerous other means. By way of example the heater, accumulator and pump may be integrated together by threaded connections, bolts, welded joints, or bound by any one or combination of a variety of known means for attaching one device to another to make an integrated apparatus.

The materials utilized for accumulator coil 24, inner and outer tubular coils (56, 58) in heater section 18, cylinder 42, tie rods (102, 104), intake tube 34, accumulator sleeve 84, the boundary flange 63 and drive head flange 82 as well as other parts of the apparatus are chosen for, amongst other things, their capacity to react to temperature gradients, withstand high pressures and insulate against heat conduction. Such materials are known to persons skilled in the art.

While the embodiment discussed considers a single piston pump with two chambers, namely intake chamber 40 and pressure chamber 46, other pump arrangements may be employed to pressurize the fluid drawn from a vessel to higher pressures. For example, it is understood that a piston pump with more than one piston or a different number of chambers may be substituted for the illustrated embodiment.

By way of example, the description discloses an apparatus that may be employed to deliver a high pressure gas utilizing the properties of the gas in a denser state to enhance the effective accumulator capacity and more easily pressurize the gas. It is understood, however, that these properties are realized in a general sense when the apparatus:

draws in a fluid at an initial temperature, $T_1$, and an initial pressure, $P_1$;

raises the pressure of that fluid to $P_2$, a pressure falling within a predetermined pressure range, where $P_2 > P_1$;

stores the fluid in an accumulator at a pressure within the predetermined pressure range, approximately $P_2$;

warms the fluid in a heater to temperature $T_2$, which falls within a predetermined temperature range that converts the fluid to a gas, where $T_2 > T_1$; and, delivers the gas at a temperature and pressure within the predetermined temperature and pressure ranges, approximately $T_2$ and $P_2$.

As such, it is understood that the fluid will be drawn in as a fluid and delivered as a gas with a higher temperature and pressure relative to the initial temperature and pressure. In a preferred embodiment, a liquid may be drawn into the apparatus and a gas delivered from the apparatus. However, depending on the operational conditions of the stored fluid and the desired properties of the gas to be delivered, a liquid or supercritical fluid or a single phase fluid may be drawn in and a gas at or above the supercritical point may be delivered. Such a gas may be thought of as a supercritical fluid or single phase fluid as well. The invention contemplates such states for the delivered gas and stored fluid.

Therefore, as noted previously, "fluids", as understood in this application, are liquids, and liquids under supercritical pressures. "Gases", as understood in this application, are gases and gases under supercritical pressures. These terms are mutually exclusive. Further, while the embodiment shown includes a hydraulic pump driver within drive section 16, numerous other drivers will suffice without departing significantly from the spirit of the invention as will be apparent to a person skilled in the art. By way of example, these may include electric motors, mechanical or engine drivers, pneumatic drivers, and so forth. The driver is a potential heat source so it is preferably disposed away from the colder pump and accumulator to reduce heat transfer to the stored cold fluid. The illustrated embodiment positions the heater and/or accumulator between the pump and the driver to assist with managing the axial temperature gradient within apparatus 12 while allowing direct fluid connections between the pump, the accumulator and the heater, thereby eliminating the need for piping between these components and reducing the number of connections which might be a source of leaks and/or failure points. The illustrated embodiment also provides a convenient arrangement for locating piston shaft 80.

By way of example but in no way limiting the scope of the disclosed invention, the following system characteristics and pre-determined parameters of a particular embodiment have been set out below for an apparatus that would be appropriate for delivering a combustible gas (e.g., natural gas, methane, propane, ethane, gaseous combustible hydrocarbon derivatives such as methanol or ethanol, hydrogen) or a combustion supporting gas (e.g., oxygen) to a combustion engine. The following is designed in regards to the apparatus receiving liquefied natural gas and delivering high pressure natural gas to an engine:

| | |
|---|---|
| Fuel storage temperature: | <200 K |
| Accumulator operational pressure: | 5000-5600 psig |
| Operational heat bath temperature: | 283-343 K |
| Inner & outer coil volume: | $1.65 \times 10^5$ mm$^3$ |
| Inner coil internal tube diameter: | 3.86 mm |
| Outer coil internal tube diameter: | 3.86 mm |
| Accumulator coil volume: | $3.32 \times 10^5$ mm$^3$ |
| Accumulator coil internal tube diameter: | 6.22 mm |
| Pressure chamber vol. (extended): | $3.74 \times 10^5$ mm$^3$ |
| Pressure chamber vol. (retracted): | $3.44 \times 10^5$ mm$^3$ |

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An apparatus for pressurizing a fluid and delivering a gas comprising:
   a. a casing assembly comprising an elongated thermally insulated body;
   b. a pump disposed at a first end of said casing assembly, said pump comprising:
      i. an intake opening for receiving said fluid in a liquid or supercritical state at an initial pressure and an initial temperature;
      ii. a pressurizing device in communication with said intake opening, said pressurizing device capable of pressurizing said fluid to a pre-determined pressure wherein said pre-determined pressure is greater than said initial pressure; and,
      iii. a high pressure discharge passage in communication with said pressurizing device for discharging said fluid from said pressurizing device;
   c. a drive section disposed at a second end of said casing assembly opposite said first end, said drive section comprising a driver for actuating said pump, said drive section spaced apart from said pump;
   d. a shaft disposed within said casing assembly and connected to said pump and to said driver, said shaft capable of transferring actuating movements from said driver to said pump;
   e. an accumulator disposed within said casing assembly between said pump and said drive section for receiving and storing a quantity of said fluid in a supercritical state within a storage pressure range, said accumulator comprising:
      i. an entrance in communication with said high pressure discharge passage for receiving said fluid;
      ii. a storage volume in communication with said entrance; and,
      iii. an exit in communication with said storage volume for delivering said fluid therefrom;
   f. a heater disposed within said casing assembly between said accumulator and said drive section, said heater capable of warming said fluid to a pre-determined temperature, thereby converting said fluid to said gas, said heater comprising:
      i. a heater inlet in communication with said exit for receiving said fluid; and,
      ii. a delivery outlet in communication with said heater inlet wherein said delivery outlet delivers said gas from said apparatus.

2. An apparatus as claimed in claim 1 wherein said casing assembly comprises a coupling to join said high pressure discharge passage directly to said entrance.

3. An apparatus as claimed in claim 1 wherein said casing assembly comprises a coupling to join said exit directly to said heater inlet.

4. An apparatus as claimed in claim 1 further comprising at least one tie rod extending through said casing assembly.

5. An apparatus as claimed in claim 1 wherein said heater further comprises a heating substance and at least one channel for housing said heating substance wherein said heating substance is capable of warming said fluid to said pre-determined temperature.

6. An apparatus as claimed in claim 5 wherein said heater further comprises a fluid passageway for directing said fluid from said heater inlet through said at least one channel to said delivery outlet.

7. An apparatus as claimed in claim 5 wherein said heater further comprises a thermal conductor, said thermal conductor disposed within said heater for transferring heat from said heating substance to said fluid.

8. An apparatus as claimed in claim 5 wherein said heating substance comprises a heating fluid capable of being circulated through said at least one channel.

9. An apparatus as claimed in claim 6 wherein said heater further comprises a heater tube disposed within said at least one channel, said heater tube defining said fluid passageway.

10. An apparatus as claimed in claim 1 wherein said heater further comprises a heater insulator capable of providing thermal insulation between said heater and said accumulator.

11. An apparatus as claimed in claim 1 wherein said pump is a reciprocating pump further comprising at least one piston disposed within a cylinder, said piston dividing said cylinder into an intake chamber and a pressure chamber.

12. An apparatus as claimed in claim 11 wherein said intake chamber is in communication with said intake opening through an intake valve, said intake valve permits one-way flow of said fluid into said intake chamber through said intake valve.

13. An apparatus as claimed in claim 11 wherein said intake chamber is in communication with said pressure chamber through a piston valve capable of allowing one-way flow of said fluid into said pressure chamber from said intake chamber.

14. An apparatus as claimed in claim 13 wherein said piston valve is disposed in said piston.

15. An apparatus as claimed in claim 11 wherein said pressure chamber is in communication with said high pressure discharge passage such that said fluid is flowable into said high pressure discharge passage once said fluid is at said pre-determined pressure.

16. An apparatus as claimed in claim 15 wherein said pressure chamber is in communication with said high pressure discharge passage through a high pressure valve, said high pressure valve capable of allowing one-way flow of said fluid into said high pressure discharge passage.

17. An apparatus as claimed in claim 16 wherein said high pressure valve prevents the flow of said fluid from said pressure chamber into said high pressure discharge passage until the pressure of said fluid is at or above said pre-determined pressure.

18. An apparatus as claimed in claim 1 wherein said accumulator further comprises a sleeve, said sleeve defining an accumulator space, said storage volume disposed within which said accumulator space.

19. An apparatus as claimed in claim 1 wherein said storage volume is defined by a coiled tube.

20. An apparatus as claimed in claim 18 wherein said accumulator further comprises a thermal insulator disposed within said accumulator space and surrounding said storage volume.

21. An apparatus as claimed in claim 20 wherein said thermal insulator is a convection barrier disposed within said accumulator space.

22. An apparatus as claimed in claim 20 wherein said thermal insulator comprises an evacuated volume within said accumulator space.

23. An apparatus as claimed in claim 20 wherein said thermal insulator comprises an insulating material disposed within said accumulator space.

24. An apparatus as claimed in claim 23 wherein said insulating material has a thermal conductivity of less than 15 W/m×K.

25. An apparatus as claimed in claim 18 wherein said sleeve is made from a thermal insulating material.

26. An apparatus as claimed in claim 25 wherein said thermal insulating material has a thermal conductivity of less than 15 W/m×K.

27. An apparatus as claimed in claim 1 further comprising a housing defining an insulating space, said insulating space surrounding said heater.

28. An apparatus as claimed in claim 27 wherein said insulating space comprises an evacuated space.

29. An apparatus as claimed in claim 1 wherein said gas is delivered at no less than 2500 psig.

30. An apparatus as claimed in claim 1 wherein said gas is delivered as a supercritical fluid.

31. An apparatus as claimed in claim 1 wherein said fluid comprises at least one of methane, methanol, ethane, propane, hydrogen, oxygen or butane.

32. An apparatus as claimed in claim 1 wherein said fluid comprises an element that is combustible as a gas.

33. An apparatus assembly as defined in claim 1 wherein said fluid comprises at least one of a methane or ethane derivative, wherein said at least one methane or ethane derivative is a gas at room temperature and atmospheric pressure.

34. A method for pressurizing a fluid and delivering said fluid as a gas comprising sequentially:
  a. receiving a quantity of a fluid into an apparatus at an initial pressure and an initial temperature;
  b. pressurizing said quantity of said fluid to within a pre-determined pressure range wherein said initial pressure falls outside of and below said pre-determined pressure range;
  c. storing said quantity of said fluid;
  d. heating said quantity of said fluid within a pre-determined temperature range and transforming said fluid to said gas, wherein said initial temperature falls outside of and below said pre-determined temperature range; and,
  e. delivering from said apparatus said gas at a pressure within said pre-determined pressure range and a temperature within said pre-determined temperature range.

35. A method as claimed in claim 34 wherein said pre-determined pressure range comprises pressures above the supercritical point of said fluid when said fluid is at said initial cryogenic temperature.

36. A method as claimed in claim 34 wherein said pre-determined pressure range comprises pressures above the supercritical point of said gas when said gas is within said pre-determined temperature range.

37. A method as claimed in claim 34 wherein said initial pressure is above the supercritical point of said fluid when said fluid is at said initial temperature.

38. An integrated apparatus for pressurizing a fluid and delivering a gas comprising:
  a. a casing assembly comprising an elongated thermally insulated body;
  b. a pump disposed at a first end of said casing assembly, said pump comprising:
    i. an intake opening for receiving said fluid at an initial pressure and an initial temperature;
    ii. a pressurizing device in communication with said intake opening, said pressurizing device capable of pressurizing said fluid to a pre-determined pressure wherein said pre-determined pressure is greater than said initial pressure; and,
    iii. a high pressure discharge passage in communication with said pressurizing device for discharging said fluid from said pressurizing device;

c. a heater disposed within said casing assembly, said heater capable of warming said fluid to a pre-determined temperature, thereby converting said fluid to said gas, said heater comprising:
  i. a heater inlet for receiving said fluid; and,
  ii. a delivery outlet in communication with said heater inlet wherein said delivery outlet delivers said gas from said apparatus said heater thermally insulated from said pump;
d. a conduit disposed within said casing assembly for receiving and delivering said fluid in a supercritical state from said high pressure discharge passage to said heater inlet; and
e. thermal insulation interposed between said heater and said pump.

39. The apparatus of claim 38 wherein said conduit has a length that provides an elongated heat path between said heater and said pump that contributes to thermally insulating said heater from said pump.

40. The apparatus of claim 38 wherein said heater further comprises a heating substance and at least one channel for housing said heating substance wherein said heating substance is capable of warming said fluid to said pre-determined temperature.

41. The apparatus of claim 38 wherein said gas is delivered at a pressure above 2500 psig.

42. The apparatus of claim 38 wherein said fluid comprises at least one of methane, ethane, propane, hydrogen, oxygen or butane.

43. A method for pressurizing a fluid and delivering said fluid as a gas comprising sequentially:

a. receiving a quantity of a fluid into an apparatus from a reservoir of said fluid stored at an initial pressure and an initial temperature;
b. pressurizing said quantity of-said fluid to within a pre-determined pressure range wherein said initial pressure falls outside of and below said pre-determined pressure range; c. delivering said quantity of said fluid away from said reservoir where said fluid is thermally insulated from said reservoir;
d. heating said quantity of said fluid to a temperature within a pre-determined temperature range and transforming said fluid to said gas, wherein said initial temperature falls outside of and below said pre-determined temperature range; and,
e. delivering from said apparatus said gas at a pressure within said pre-determined pressure range and a temperature within said pre-determined temperature range.

44. A method as claimed in claim 43 wherein said pre-determined pressure range comprises pressures above the supercritical point of said fluid when said fluid is at said initial cryogenic temperature.

45. The apparatus of claim 1 wherein said casing assembly comprises an elongated thermally insulated hollow body.

46. The apparatus of claim 45 wherein said casing assembly is tubular.

47. The apparatus of claim 38 wherein said casing assembly comprises an elongated thermally insulated hollow body.

48. The apparatus of claim 47 wherein said casing assembly is tubular.

* * * * *

UNITED STATES PATENT AND TRADEMARK OFFICE
CERTIFICATE OF CORRECTION

PATENT NO. : 7,607,898 B2  Page 1 of 1
APPLICATION NO. : 10/497429
DATED : October 27, 2009
INVENTOR(S) : Noble et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1066 days.

Signed and Sealed this

Twelfth Day of October, 2010

David J. Kappos
*Director of the United States Patent and Trademark Office*